(12) United States Patent
Zeng et al.

(10) Patent No.: US 7,739,261 B2
(45) Date of Patent: Jun. 15, 2010

(54) IDENTIFICATION OF TOPICS FOR ONLINE DISCUSSIONS BASED ON LANGUAGE PATTERNS

(75) Inventors: Hua-Jun Zeng, Beijing (CN); Hua Li, Beijing (CN); Jian Hu, Beijing (CN); Zheng Chen, Beijing (CN); Duo Zhang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 11/763,282

(22) Filed: Jun. 14, 2007

(65) Prior Publication Data

US 2008/0313180 A1    Dec. 18, 2008

(51) Int. Cl.
G06F 17/30 (2006.01)
(52) U.S. Cl. ............... 707/708; 707/738; 707/749; 707/754; 704/9
(58) Field of Classification Search ............... 707/6, 707/E17.014, 101, 104.1, 708, 999.006, 731, 707/738, 749, 754; 704/9
See application file for complete search history.

(56) References Cited

U.S. PATENT DOCUMENTS

| | | | |
|---|---|---|---|
| 6,104,989 A * | 8/2000 | Kanevsky et al. ............... 704/9 |
| 6,473,757 B1 | 10/2002 | Garofalakis et al. |
| 6,574,624 B1 * | 6/2003 | Johnson et al. ................ 707/5 |
| 6,721,728 B2 * | 4/2004 | McGreevy ..................... 707/3 |
| 6,981,040 B1 | 12/2005 | Konig et al. |
| 7,107,261 B2 | 9/2006 | Farrett |
| 7,167,910 B2 | 1/2007 | Farnham et al. |
| 7,206,787 B2 * | 4/2007 | Corston-Oliver et al. .... 707/101 |
| 2002/0042794 A1 * | 4/2002 | Konaka ......................... 707/6 |
| 2003/0167276 A1 * | 9/2003 | Simpson et al. ............ 707/102 |
| 2003/0195928 A1 * | 10/2003 | Kamijo et al. .............. 709/204 |
| 2004/0111479 A1 | 6/2004 | Borden et al. |
| 2004/0243627 A1 | 12/2004 | Jensen et al. |
| 2005/0235034 A1 | 10/2005 | Chen et al. |
| 2005/0256905 A1 * | 11/2005 | Gruhl et al. .............. 707/104.1 |
| 2006/0212441 A1 * | 9/2006 | Tang et al. .................... 707/5 |
| 2006/0242180 A1 | 10/2006 | Graf et al. |

OTHER PUBLICATIONS

Creswell, Cassandre, et al., "Information Extraction for Muli-Participant, Task-Oriented, Synchronous, Computer-Mediated Communication: A Corpus Study of Chat Data," 2007 (8 pages).
Appan, Preetha et al., "Interactive Visualization and Content Analysis of Instant Messaging Networks," 2005 (4 pages).
Paik, Woojin et al., "Applying Natural Language Processing (NLP) Based Metadata Extraction to Automatically Acquire User Preferences," K-CAP '01, Oct. 22-23, 2001, Victoria, British Columbia, Copyright 2001 (7 pages).

* cited by examiner

Primary Examiner—Tim T. Vo
Assistant Examiner—Shiow-Jy Fan
(74) Attorney, Agent, or Firm—Perkins Coie LLP

(57) ABSTRACT

A topic identification system identifies topics of online discussions by iteratively identifying topic words or keywords of the online discussions and identifying language patterns associated with those keywords. The topic identification system starts out with an initial set of keywords and identifies language patterns that each include a keyword. The topic identification system then uses the identified language patterns to identify additional keywords of the online discussion that match the patterns. The topic identification system then again identifies language patterns using the keywords including the newly identified keywords. The topic identification system may repeat the process of identifying language patterns and keywords until a termination criterion is satisfied.

17 Claims, 8 Drawing Sheets

IDENTIFICATION OF TOPICS FOR ONLINE DISCUSSIONS BASED ON LANGUAGE PATTERNS

BACKGROUND

Many web sites and advertisement placement services generate considerable revenue from the placement of advertisements. The revenue model for many web sites is a click-through model in which an advertiser pays for placement of the advertisement only when a user clicks on the advertisement. The advertiser and the web site provider both have incentives to ensure that advertisements are likely to be of interest to the user of the web page. If the advertisement is not of interest, then the user is unlikely to click on the advertisement. For example, if the web page relates to the locations of basketball courts provided by a city and the advertisement relates to buying flowers, the user interested in the location of basketball courts is unlikely to be interested in buying flowers. If the user does not click on the advertisement, the web site provider loses revenue it might have received if the advertisement had been of interest to the user. If the user does click on the advertisement, the advertiser will pay for the advertisement even though the advertiser is unlikely to generate revenue from that placement because the user is unlikely to purchase flowers.

To help ensure that advertisements may be of interest to the user of a web page, advertisements are selected based on relevance to the content of the web page. To help ensure that advertisements are related to the content of a web page, the advertisers may specify a target word for placing an advertisement. If a web page is related to the target word, then the advertisement may be assumed to be related to the content of the web page. For example, an advertiser who is advertising basketball shoes may specify target words of "basketball shoe," "basketball court," and "basketball." The advertiser may be willing to pay more for the advertisement when it is placed on a web page that contains the target word "basketball shoes" than the other two because it is more specific to the product being advertised.

Advertisements are often placed on display pages (e.g., web pages) for online discussions such as instant messaging sessions, discussion threads, web logs ("blogs"), and so on. Advertisements that relate in some way to the topic of an online discussion are generally effective when placed with the online discussion. However, it probably would not be effective to place an advertisement for courtside tickets for a basketball game with an online discussion relating to analysis of opinions of the U.S. Supreme Court even though the advertisement and online discussion are related in some way to the keyword "court." An advertisement relating to online access to briefs filed with the Supreme Court is related to the topic of the online discussion. Such an advertisement is likely to be more effective than an advertisement for courtside tickets. The effectiveness of the advertisements for online discussions depends in large part on the effectiveness of identifying the topics of the online discussions. Although several attempts have been made to identify the topics of online discussions, these attempts have not proved to be completely satisfactory.

Identifying the topics of online discussions is also useful in many applications other than the placement of advertisements. For example, if online discussions are categorized according to their topics, users can browse the categories to locate online discussions of interest. As another example, a search engine service for online discussions may input a query and output an indication of online discussions that match the query. The search engine service may rank the matching online discussions higher when the topics of the online discussion match the terms of the query. For example, if the query is "supreme court," then a matching online discussion whose topics include "courts" would have its ranking increased. Another example of an application that uses the topic of an online discussion is the generating of discussion summaries. A summary of an online discussion may be generated by selecting the most relevant sentences to the topics of the online discussion. The relevance of a sentence may be based in part on whether the sentence contains a word relating to a topic of the discussion.

SUMMARY

Identification of topics of online discussions based on iterative identification of language patterns that tend to be used in conjunction with words that describe the topics of the online discussions is provided. A topic identification system identifies topics of online discussions by iteratively identifying topic words or keywords of the online discussions and identifying language patterns associated with those keywords. The topic identification system starts out with an initial set of keywords and identifies language patterns that each include a keyword. The topic identification system then uses the identified language patterns to identify additional keywords of the online discussion that match the patterns. The topic identification system then again identifies language patterns using the keywords including the newly identified keywords. The topic identification system may repeat the process of identifying language patterns and keywords until a termination criterion is satisfied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
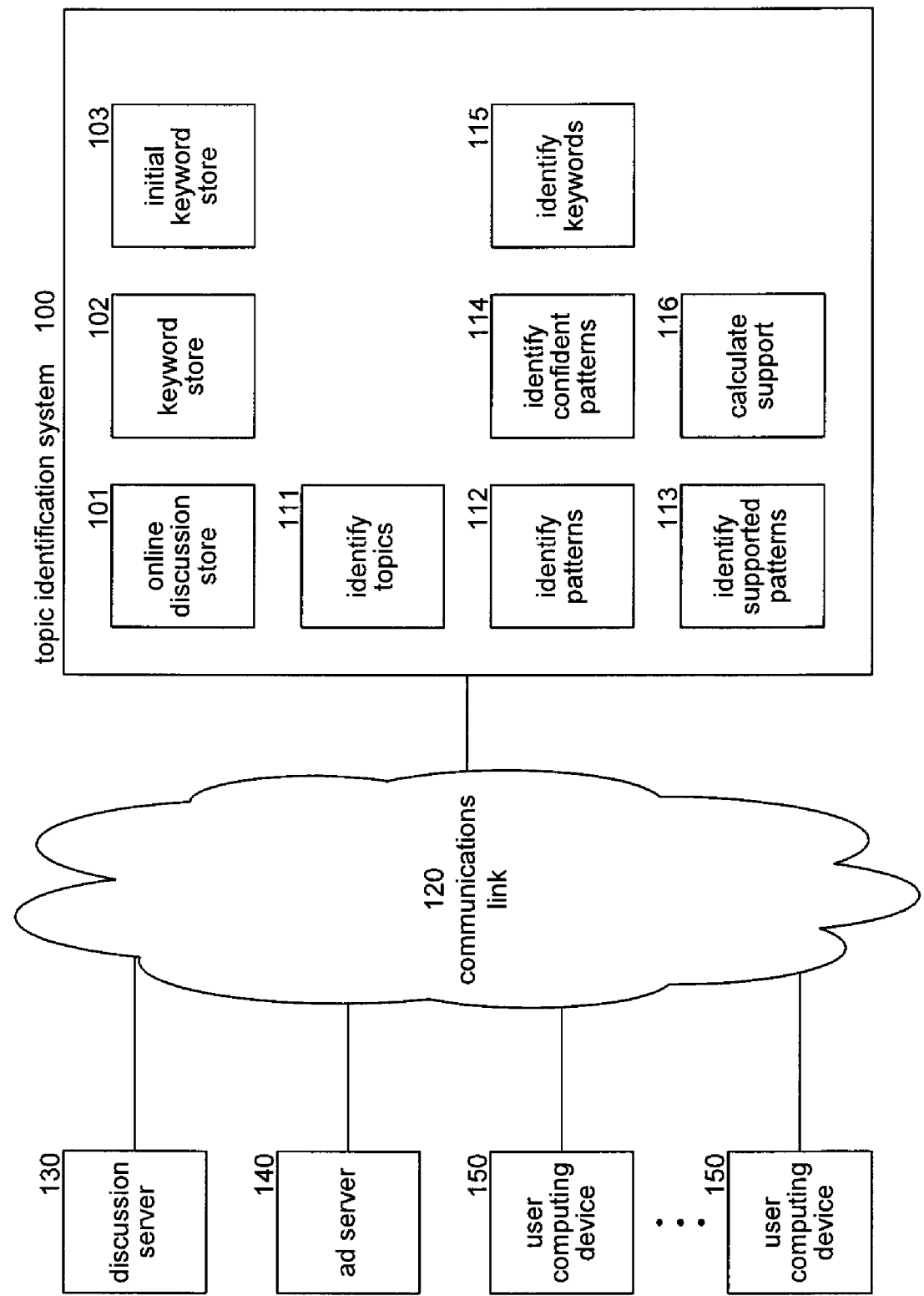
FIG. 1 is a block diagram that illustrates processing of the topic identification system in some embodiments.

Identification of topics of online discussions based on iterative identification of language patterns that tend to be used in conjunction with words that describe the topics of the online discussions is provided. In some embodiments, a topic identification system identifies topics of online discussions by iteratively identifying topic words or keywords of the online discussions and identifying language patterns associated with those keywords. The online discussions form a corpus of sentences of words. The topic identification system starts out with an initial set of keywords and identifies language patterns that each include a keyword. For example, the initial set of keywords may include "computer" and "notebook," and the online discussions may include sentences with the phrases "Let's talk about computers" and "Let's talk about notebooks." In such a case, the topic identification system may identify "Let's talk about <keyword>" as a language pattern. The topic identification system then uses the identified language patterns to identify additional topics of the online discussion. For example, if the online discussion includes a sentence with the phrase "Let's talk about laptops," then the topic discussion system may identify the word "laptops" as a keyword. The topic identification system then again identifies language patterns using the keywords including the newly identified keywords. For example, if the online discussions include a sentence with the phrase "I want to buy a laptop," then the topic identification system may identify the phrase "I want to buy a <keyword>" as a language pattern. The topic identification system may repeat the process of identifying language patterns and keywords until a termination criterion is satisfied, such as no new language patterns are identified during the last iteration. The identified keywords may be considered to represent the topics of the online discussions and can be used in various applications such as advertising, searching for online discussions, summarizing online discussions, and so on. In addition, the identified language patterns may be useful in extracting topics from other online discussions.

In some embodiments, the topic identification system may use an initial list of keywords that is created manually or automatically. The initial list of keywords may be extracted automatically from a standard taxonomy used in categorizing documents. For example, the topic identification system may use the categories of the Open Directory Project (http://dmoz.org) as the initial set of keywords.

In some embodiments, the topic identification system preprocesses the sentences of a corpus to facilitate the identification of language patterns and keywords. The preprocessing may include normalizing the words, replacing keywords with a keyword symbol, and identifying sequence segments of the sentences that include keywords. The topic identification system normalizes the words of the sentences by transforming letters of words to lowercase, removing stop words, and stemming the words. The topic identification system removes stop words such as "a," "the," "his," and so on. The topic identification system may preserve prepositions (e.g., "about" and "in"), quantity words (e.g., "more" and "many"), and other words that tend to be used in language patterns relating to topics.

The topic identification system replaces keywords with a keyword symbol to facilitate the identification of language patterns that include a keyword. For example, if the keywords include "computers" and "notebooks," then the topic identification system replaces all occurrences of those keywords in the corpus with the keyword symbol "<keyword>." This replacement helps to facilitate identification of a language pattern that includes a keyword by considering the particular keyword used in the pattern to not be particularly relevant to the language pattern. The language pattern for the phrases "Let's talk about computers" and "Let's talk about notebooks" can be more easily identified (i.e., less computationally expensive) when these phrases are both represented as "Let's talk about <keyword>."

The topic identification system identifies the sequence segments of the sentences of the corpus. A sequence segment includes a keyword along with words adjacent to the keyword. For example, if the corpus contains the sentence "When you have a chance, let's talk about <keyword> for my home business needs," then a sequence segment may be "let's talk about <keyword> home business." In some embodiments, the topic identification system defines a segment sequence to include three words before a keyword, the keyword, and two words after the keyword. One skilled in the art will appreciate that definitions of segment sequences can vary. For example, a segment sequence may be defined to include four words before the keyword, the keyword, and three words after the keyword.

In some embodiments, after the sentences of the corpus are preprocessed, the topic identification system applies a sequential pattern mining algorithm to identify language patterns within the corpus. Examples of sequential pattern mining algorithms are described in Agrawal, R. and Srikant, R., "Mining Sequential Patterns Generalizations and Performance Improvements," Proceedings of the 5th International Conference on Extending Database Technology, 1996, and Pei, J., Han, J., Mortazavi-Asl, B., Wang, J., Pinto, H., Chen, Q., Dayal, U., and Hsu, M., "Mining Sequential Patterns by Pattern-Growth: The PrefixSpan Approach," IEEE Transactions on Knowledge and Data Engineering, vol. 16, no. 11, November 2004, which are hereby incorporated by reference. A sequential pattern mining algorithm identifies as candidate patterns those patterns less than a specified length and with a support that satisfies a pattern support criterion. The support for a pattern may be measured by a support score that is a count of all the patterns that contain that pattern as a subpattern. For example, the pattern "talk about <keyword>" is contained in the patterns "talk about <keyword>," "let's talk about <keyword>," and "I want to talk about <keyword> home business," but not in the phrase "let's discuss <keyword>." A high support score tends to indicate that the pattern is a meaningful pattern within the corpus. The topic identification system may use a pattern support criterion that is a minimum support score needed for a pattern to be identified as a candidate pattern. The pattern support criterion may also be a minimum normalized support in which the support is normalized by the number of patterns.

In some embodiments, the topic identification system further filters the candidate patterns to cull out those candidate patterns that may not be particularly meaningful indicators of topics. For example, the topic identification system may remove all candidate patterns that do not include the keyword symbol since the keyword symbol is needed to know the placement of the keyword within the pattern. The topic identification system may also remove candidate patterns that include only prepositions along with a keyword symbol. For example, the topic identification system would remove the language patterns of "in <keyword> on" and "at <keyword> of." The topic identification system may also remove those candidate patterns that do not satisfy a pattern confidence criterion. The pattern confidence criterion may be defined as a pattern confidence score exceeding a minimum pattern confidence score. The pattern confidence score of a candidate pattern may be defined as the support score for the candidate pattern divided by the support score for the candidate pattern without the keyword symbol. The support score for a candidate pattern without the keyword symbol provides an indication of the frequency with which the candidate pattern is used without a keyword. For example, if the support score for a pattern is 200 and the support score for the pattern without a keyword is 20, then the pattern confidence score would be 10. In contrast, if the support score for the pattern is 20 and the support score for the pattern without a keyword is 200, then the pattern confidence score would be 0.1. A pattern with a pattern confidence score of 10 is more likely representative of a pattern associated with a topic word than a pattern with a pattern confidence score of 0.1.

In some embodiments, the topic identification system then identifies the keywords from the sentences of the corpus using the candidate language patterns remaining after filtering. The topic identification system applies each language pattern to the sentences of the corpus to identify where the patterns match the sentences. For example, the language pattern "talk about <keyword>" matches the sentence "Let's talk about computers for my home business." When a match is found, the topic identification system designates the word that matches the keyword symbol as a keyword. Continuing with the example, the topic identification system would designate the word "computers" as a keyword. The topic identification system may also generate a keyword confidence score for each designated keyword to indicate the confidence it has that the designated keyword is indeed a keyword or a topic word. If the keyword confidence score does not satisfy a keyword confidence criterion, then the keyword is removed from being identified as a keyword. The topic identification system may generate a keyword confidence score for a keyword by summing up the pattern confidence scores for all the patterns for which the keyword was designated. For example, if the topic identification system identified that the keyword "computer" occurred in five different language patterns (e.g., "let's talk about <keyword>" and "I want to buy <keyword>"), then the topic identification system sums the pattern confidence scores for those five patterns to generate the keyword confidence score. The topic identification system may then filter out keywords whose keyword confidence scores do not satisfy a minimum keyword confidence, are not in a top certain number of keyword confidence scores (e.g., not a top 20 score), are not in a top certain percentage of keyword confidence scores (e.g., not in the top 20% of the scores), and so on.

FIG. 1 is a block diagram that illustrates processing of the topic identification system in some embodiments. The topic identification system 100 may be connected to a discussion server 130, an advertisement server 140, and user computing devices 150 via a communications link 120. The discussion server may interact with the advertisement server to select advertisements for placement along with the online discussions. The discussion server may provide online discussions to the topic identification system and receive the identification of keywords in return. The discussion server may then provide those keywords to the advertisement server for selection of advertisements related to the topics of the online discussions.

The topic identification system may also include an online discussion store 101, a keyword store 102, and an initial keyword store 103. The online discussion store contains the sentences of the corpus of the online discussions provided by a discussion server. The initial keyword store contains the initial set of keywords for use in identifying the initial language patterns from the sentences of the corpus. The initial set of keywords may be generated using automated means from a standard taxonomy of documents. The keyword store contains the keywords identified during each iteration performed by the topic identification system.

The topic identification system may also include an identify topics component 111, an identify patterns component 112, an identify supported patterns component 113, an identify confident patterns component 114, an identify keywords component 115, and a calculate support component 116. The identify topics component iteratively invokes the identify patterns component and the identify keywords component to identify the topic words of the online discussions. The identify patterns component identifies patterns using a sequential pattern mining technique and then invokes the identify supported patterns component to identify as candidate patterns those patterns whose pattern support satisfies a pattern support criterion. The identify supported patterns component invokes a calculate support component to calculate a support score for the patterns. The identify topics component may also invoke the identify confident patterns component to identify the candidate patterns with sufficient confidence to indicate that they are meaningful patterns for indicating topics. The identify keywords component identifies keywords from the online discussions using the identified patterns.

The computing device on which the topic identification system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the topic identification system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The topic identification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
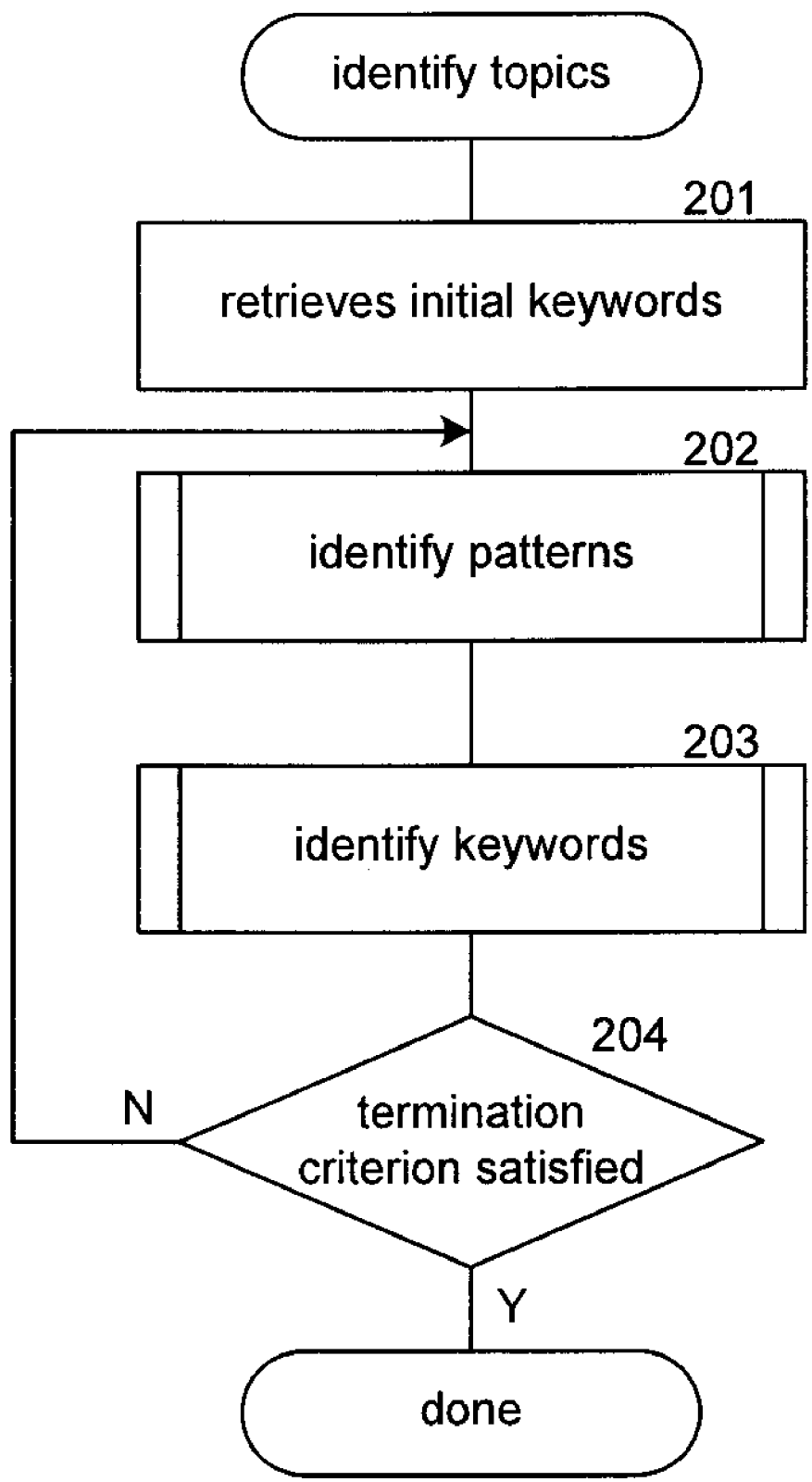
FIG. 2 is a flow diagram that illustrates high-level processing of the identify topics component of the topic identification system in some embodiments.

FIG. 2 is a flow diagram that illustrates high-level processing of the identify topics component of the topic identification system in some embodiments. The component iteratively identifies patterns and keywords of the online discussions until a termination criterion is satisfied. In block 201, the component retrieves the initial set of keywords. In blocks 202-204, the component loops identifying patterns and keywords. In block 202, the component invokes the identify patterns component to identify patterns that are indications of topic words. In block 203, the component invokes the identify keywords component to identify keywords of the online discussions using the identified patterns. In decision block 204, if a termination criterion is satisfied (e.g., no new keywords identified), then the component completes, else the component loops to block 202 to perform the next iteration.

Figure 3:
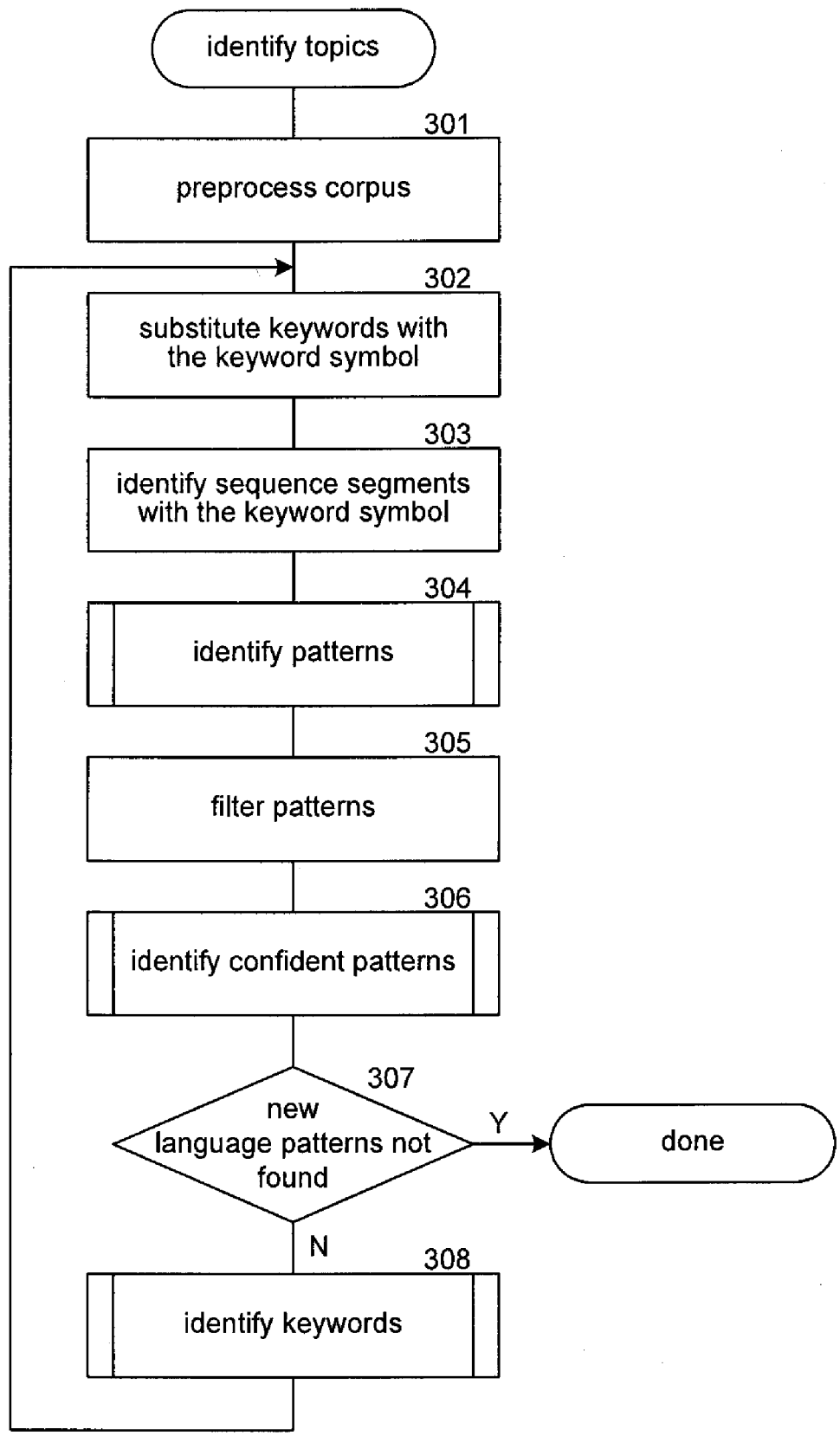
FIG. 3 is a flow diagram that illustrates lower-level processing of the identify topics component of the topic identification system in some embodiments.

FIG. 3 is a flow diagram that illustrates lower-level processing of the identify topics component of the topic identification system in some embodiments. In block 301, the component preprocesses the corpus, for example, to remove stop words and to normalize the words of the corpus (e.g., stem the words). In block 302, the component generates a copy of the corpus with keywords replaced with a keyword symbol. In block 303, the component identifies sequence segments of the corpus that contain the keyword symbol. In block 304, the component invokes the identify patterns component to identify candidate patterns from the sequence segments. In block 305, the component filters out some patterns that are not meaningful, such as those that do not contain a keyword symbol or contain only the keyword symbol and prepositions. In block 306, the component invokes the identify confident patterns component to identify the candidate patterns with sufficient confidence to be considered meaningful patterns. In decision block 307, if a new language pattern was not discovered in this iteration (i.e., a termination criterion), then the component completes, else the component continues at block 308. In block 308, the component invokes the identify keywords component to identify keywords from the corpus using the meaningful patterns. The component then loops to block 302 to start the next iteration.

Figure 4:
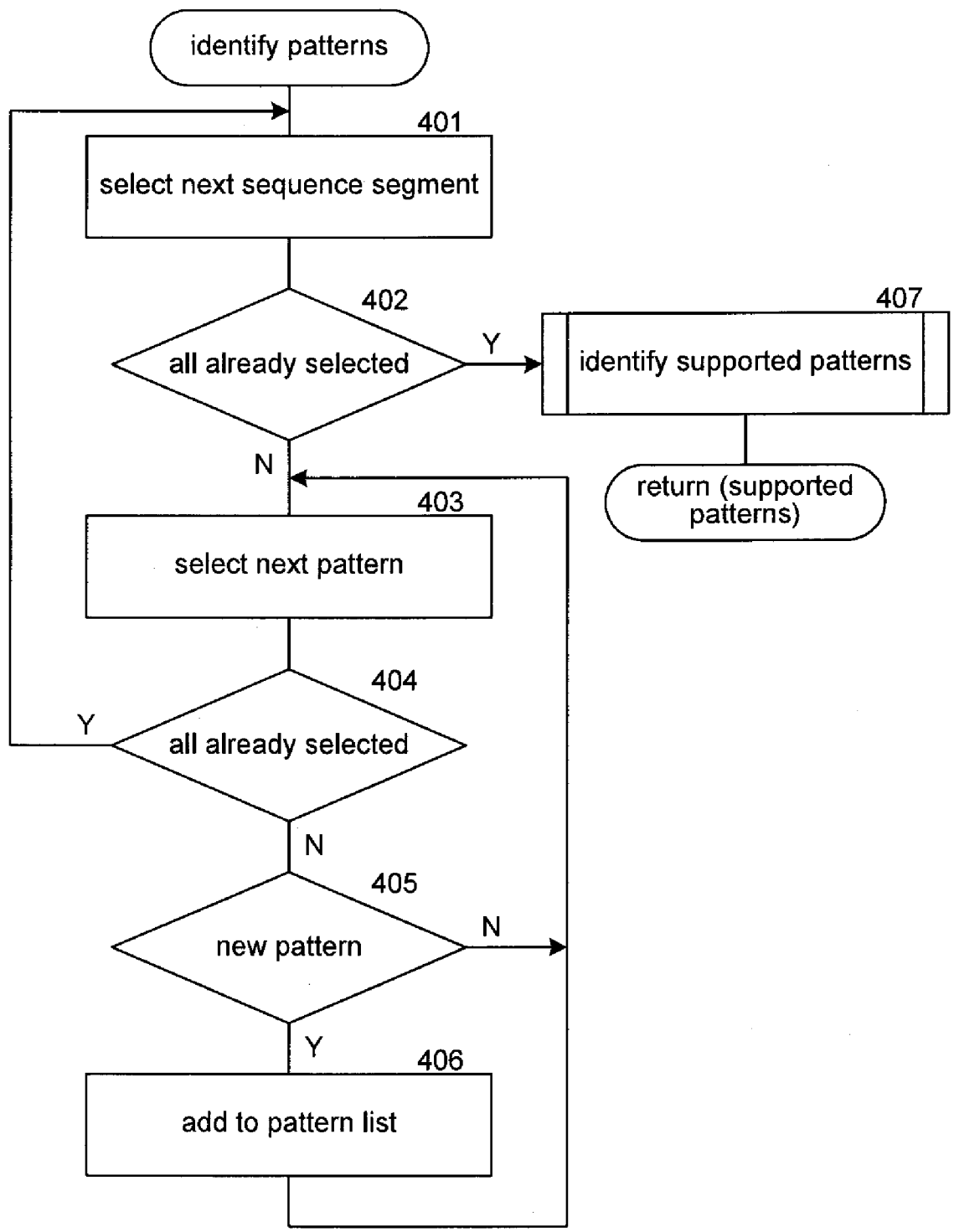
FIG. 4 is a flow diagram that illustrates the processing of the identify patterns component of the topic identification system in some embodiments.

FIG. 4 is a flow diagram that illustrates the processing of the identify patterns component of the topic identification system in some embodiments. The component identifies the patterns with the sequence segments and then identifies the supported patterns. This flow diagram illustrates the logical process of identifying patterns. Since the identification of patterns in a large corpus can be computationally expensive, the component may actually be implemented using various sequential pattern mining techniques to reduce the computational expense. In block 401, the component selects the next sequence segment. In decision block 402, if all the sequence segments have already been selected, then the component continues at block 407, else the component continues at block 403. In block 403, the component selects the next pattern of the selected sequence segment. In decision block 404, if all the patterns of the selected sequence segment have already been selected, then the component loops to block 401 to select the next sequence segment, else the component continues at block 405. In decision block 405, if the selected pattern is a new pattern, then the component continues at block 406, else the component loops to block 403 to select the next pattern. In block 406, the component adds the pattern to the pattern list and then loops to block 403 to select the next pattern. In block 407, the component invokes the identify supported patterns component to identify the patterns that are supported and then returns the supported patterns.

Figure 5:
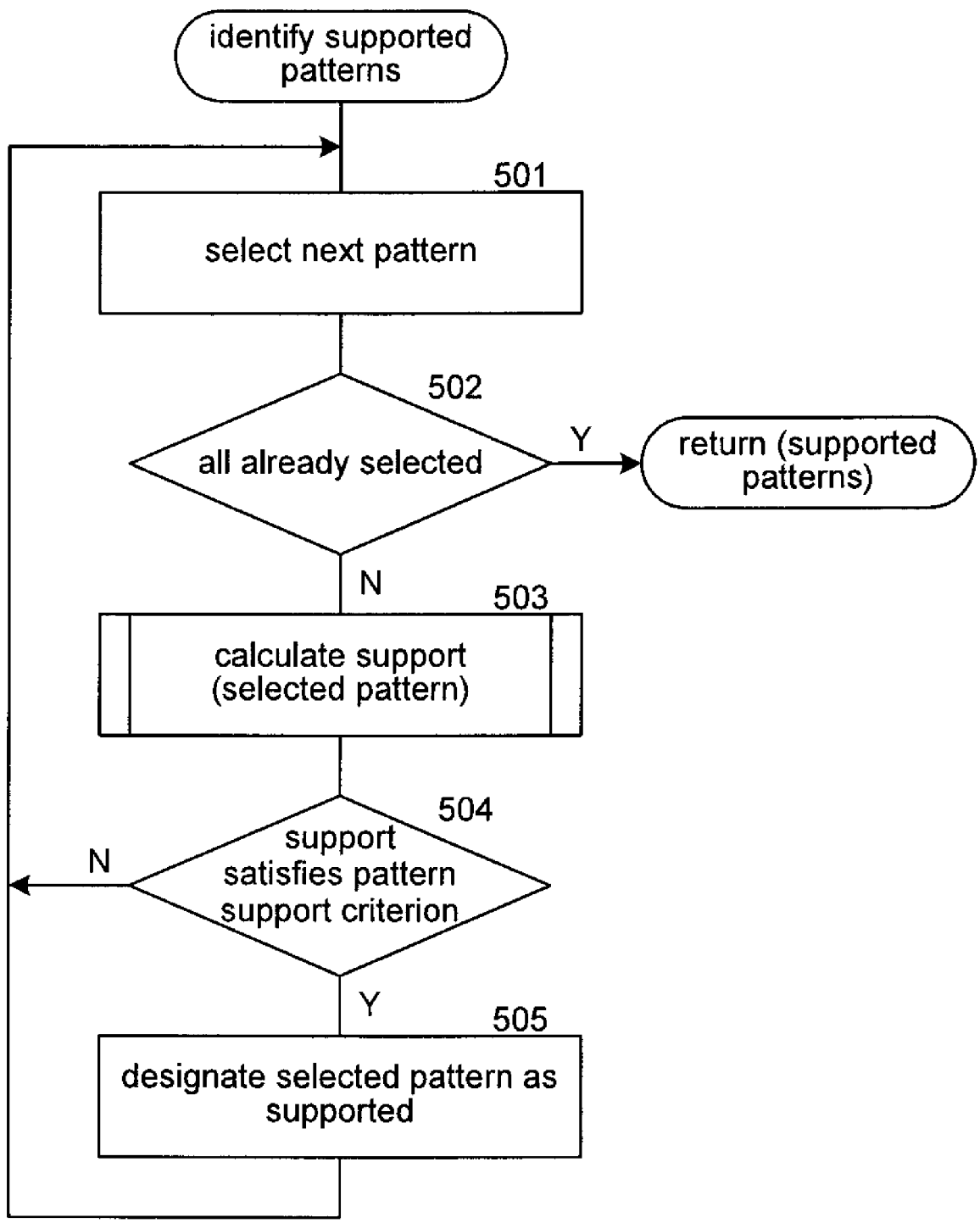
FIG. 5 is a flow diagram that illustrates the processing of the identify supported patterns component of the topic identification system in some embodiments.

FIG. 5 is a flow diagram that illustrates the processing of the identify supported patterns component of the topic identification system in some embodiments. The component identifies those patterns that satisfy a pattern support criterion. In block 501, the component selects the next pattern. In decision block 502, if all the patterns have already been selected, then the component returns the supported patterns, else the component continues at block 503. In block 503, the component invokes the calculate support component passing the selected pattern to calculate a support score for the selected pattern. In decision block 504, if the support score satisfies a pattern support criterion, then the component continues at block 505, else the component loops to block 501 to select the next pattern. In block 505, the component designates a selected pattern as a supported pattern and then loops to block 501 to select the next pattern.

Figure 6:
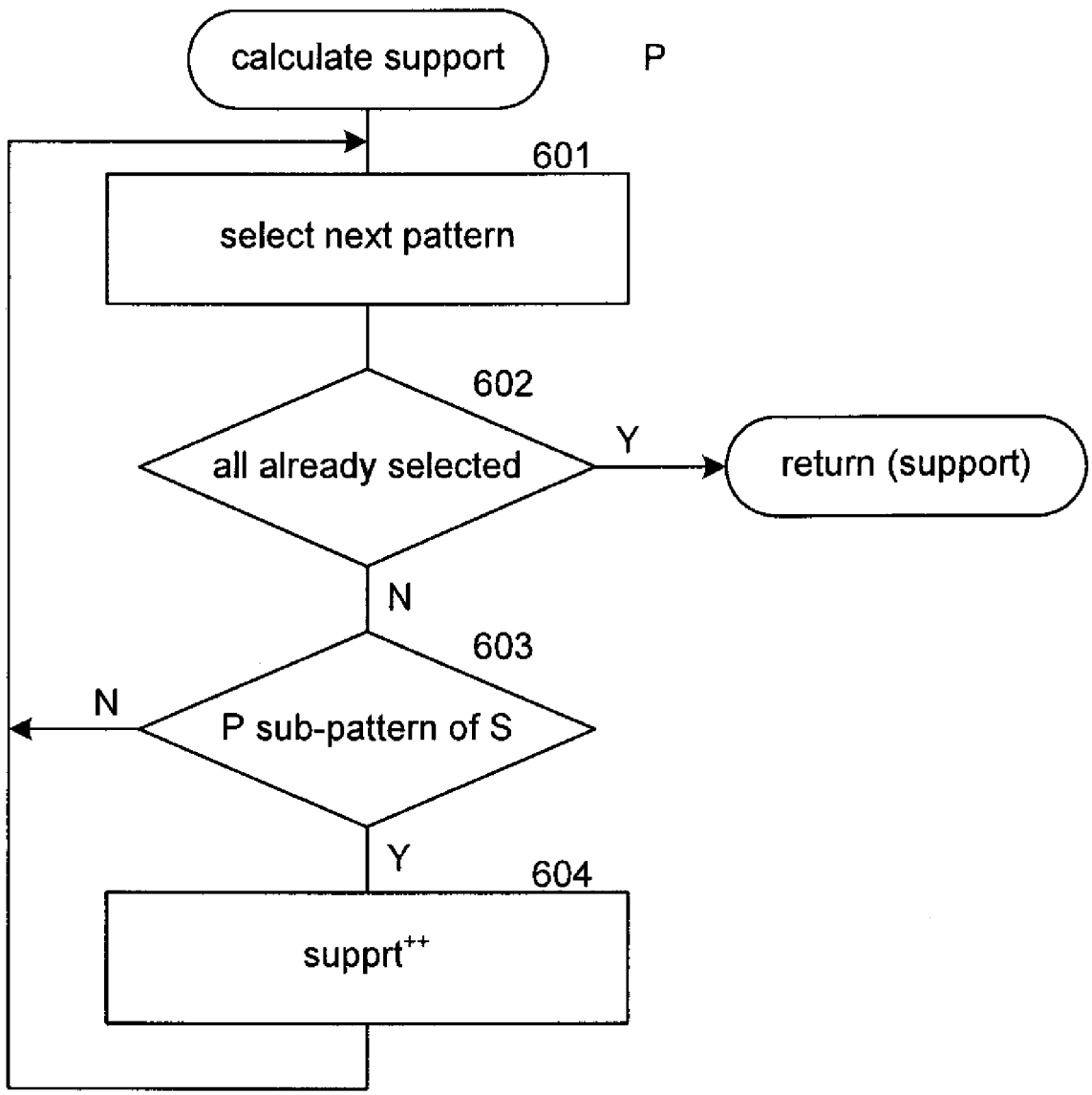
FIG. 6 is a flow diagram that illustrates the processing of the calculate support component of the topic identification system in some embodiments.

FIG. 6 is a flow diagram that illustrates the processing of the calculate support component of the topic identification system in some embodiments. The component is passed a pattern and calculates a support score for the pattern. In block 601, the component selects the next pattern that was identified during the sequential pattern mining. In decision block 602, if all the patterns have already been selected, then the component returns the support score, else the component continues at block 603. In decision block 603, if the passed pattern is a sub-pattern of the selected pattern, then the component continues at block 604 to increment the support score for the passed pattern. The component then loops to block 601 to select the next pattern.

Figure 7:
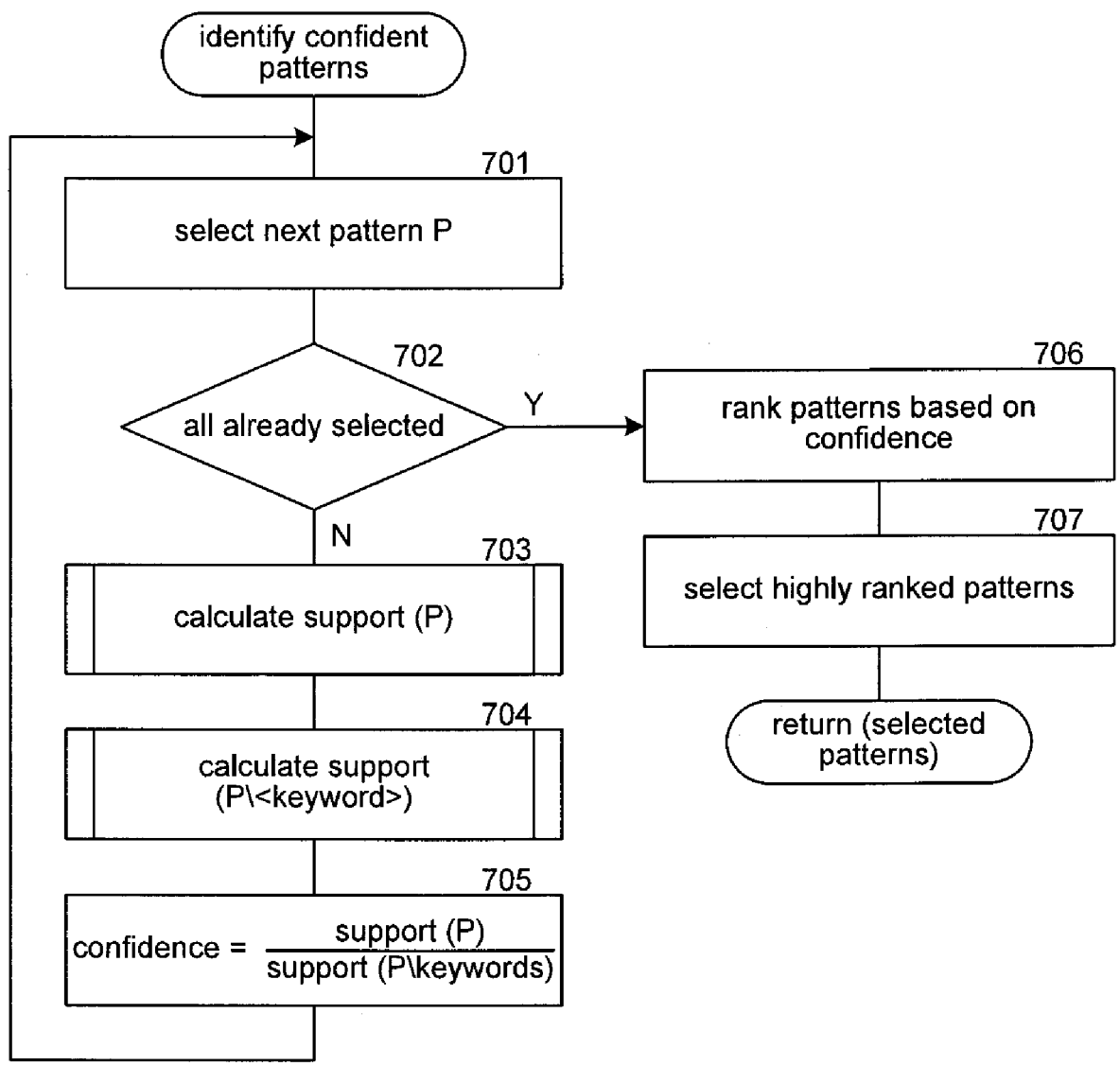
FIG. 7 is a flow diagram that illustrates the processing of the identify confident patterns component of the topic identification system in some embodiments.

FIG. 7 is a flow diagram that illustrates the processing of the identify confident patterns component of the topic identification system in some embodiments. The component generates confidence scores for the candidate patterns and then selects the patterns with the highest confidence scores. In block 701, the component selects the next candidate pattern. In decision block 702, if all the candidate patterns have already been selected, then the component continues at block 706, else the component continues at block 703. In block 703, the component invokes the calculate support component to calculate a support score for the selected pattern. In block 704, the component invokes the calculate support component to calculate a support score for the selected pattern without the keyword symbol. In block 705, the component sets the confidence score to the support score for the selected pattern divided by the support score for the selected pattern without the keyword symbol. The component then loops to block 701 to select the next pattern. In block 706, the component ranks the patterns based on their confidence scores. In block 707, the component selects highly ranked patterns and returns an indication of those patterns as confident patterns.

Figure 8:
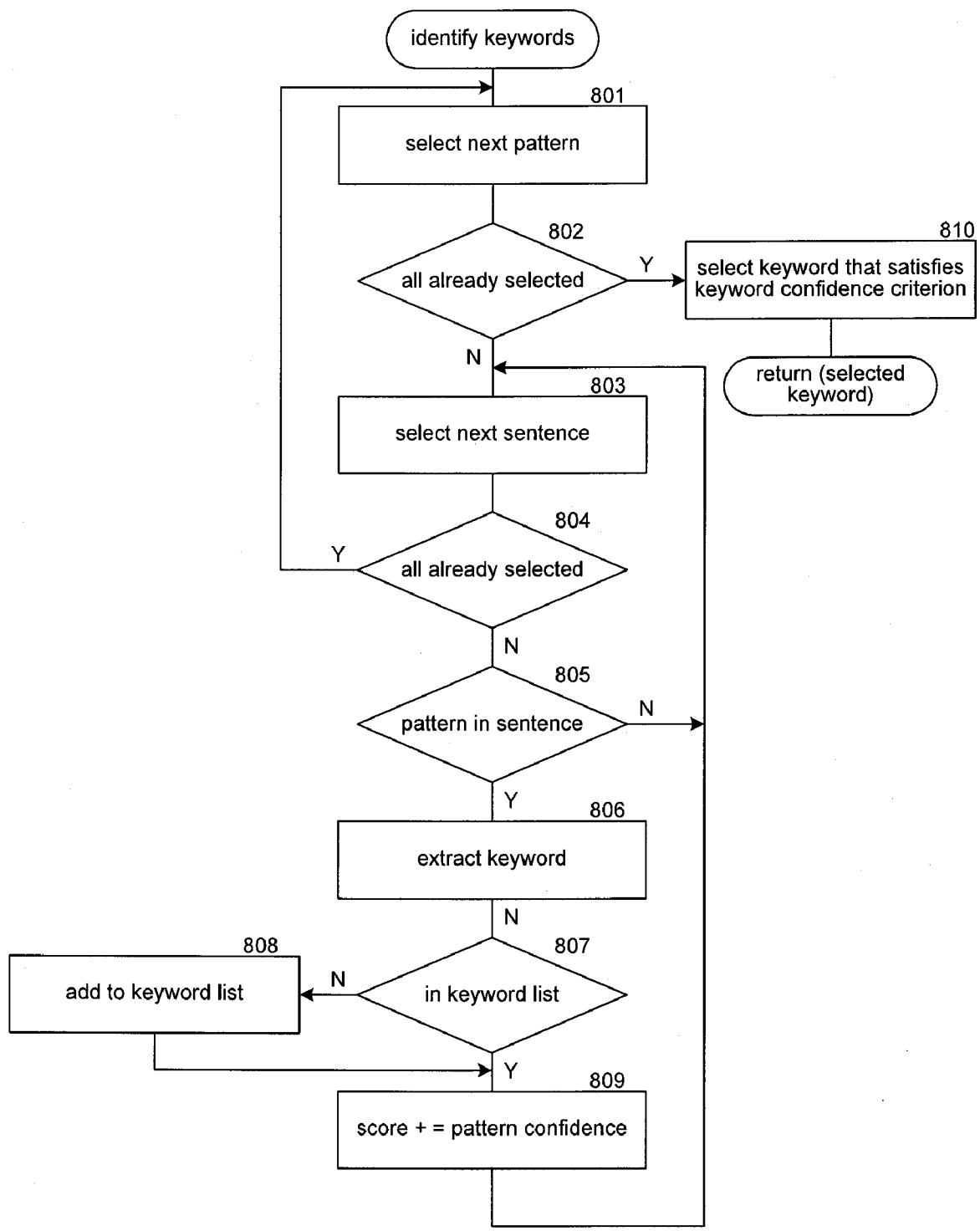
FIG. 8 is a flow diagram that illustrates the processing of the identify keywords component of the topic identification system in some embodiments.

FIG. 8 is a flow diagram that illustrates the processing of the identify keywords component of the topic identification system in some embodiments. The component identifies keywords from the corpus using the identified patterns. In block 801, the component selects the next pattern. In decision block 802, if all the patterns have already been selected, then the component continues at block 810, else the component continues at block 803. In blocks 803-809, the component loops selecting sentences and calculating a pattern confidence score for the selected pattern. In block 803, the component selects the next sentence of the corpus. In decision block 804, if all the sentences of the corpus have already been selected for the selected pattern, then the component loops to block 801 to select the next pattern, else the component continues at block 805. In decision block 805, if the selected pattern is in the selected sentence, then the component continues at block 806, else the component loops to block 803 to select the next sentence. In block 806, the component extracts the keyword corresponding to the pattern from the selected sentence. In decision block 807, if the keyword is already in the list of keywords, then the component continues at block 809, else the component continues at block 808. In block 808, the component adds the keyword to a list of keywords and initializes its keyword confidence score to zero. In block 809, the component increments the keyword confidence score for the keyword by the pattern confidence score of the selected pattern and then loops to block 803 to select the next sentence. In block 810, the component selects keywords that satisfy a keyword confidence criterion and returns those selected keywords.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the parts of speech of the words may also be used when identifying meaningful language patterns. The topic identification system may also be used to identify topics in documents unrelated to online discussions, such as content of web pages, scholarly articles, and so on. As used herein, the term "sentence" refers to a sequence of words that may not necessarily be a syntactically correct sentence. Accordingly, the invention is not limited except as by the appended claims.

We claim:

1. A method in a computing device for identifying keywords from a corpus of sentences of words, the method comprising:
    storing an initial set of keywords as a current set of keywords;
    locating, from sentences of the corpus, words that are keywords of the current set of keywords and replacing each located word with an occurrence of keyword symbol;
    for each occurrence of a keyword symbol of a sentence of the corpus, identifying a sequence segment that includes the occurrence of the keyword symbol along with words of the sentence that are adjacent to the keyword symbol;
    applying a pattern mining algorithm to the identified sequence segments to identify patterns of words adjacent to the occurrences of the keyword symbol by comparing words adjacent to an occurrence of a keyword symbol to words adjacent to other occurrences of the keyword symbol to derive patterns from the adjacent words, some of identified patterns including the keyword symbol and others of the identified patterns not including the keyword symbol;
    filtering out from the identified patterns the identified patterns that do not include the keyword symbol;
    filtering out from the identified patterns the identified patterns that include only prepositions in addition to the keyword symbol;
    identifying, from the sentences of the corpus, a new current set of keywords that satisfy a keyword confidence criterion based on the identified patterns by applying each identified pattern to the sentences and when an identified pattern matches a sentence, designating the word of the sentence corresponding to the keyword symbol of the identified pattern as a keyword of the new current set of keywords; and
    repeating the locating of words, the identifying of sequence segments, the applying of the pattern matching algorithm to identify patterns, and the identifying of keywords using the new current set of keywords until a termination criterion is satisfied and then indicating that the keywords of the identified new current sets of keywords are keywords of the corpus.

2. The method of claim 1 wherein the corpus includes content from online discussions.

3. The method of claim 2 wherein a pattern is identified as a candidate pattern when support for the pattern satisfies a pattern support criterion.

4. The method of claim 3 wherein the support for a pattern is represented by a pattern support score and the pattern support criterion is a minimum pattern support score needed for the pattern to be considered a candidate pattern.

5. The method of claim 1 wherein the identifying of the patterns applies a sequential pattern mining technique.

6. The method of claim 1 including submitting an advertisement for placement with content that relates to an identified keyword.

7. The method of claim 1 including filtering out patterns that do not satisfy a pattern confidence criterion.

8. The method of claim 1 wherein the keyword confidence criterion being based on pattern confidence scores of patterns from which a keyword was identified.

9. A computing device that identifies keywords from a corpus of sentences of words from online discussions, comprising:
    a keyword store containing keywords, the keyword store having an initial set of keywords;
    a corpus store containing sentences of the corpus;
    a component that identifies sequence segments of the sentences of the corpus, a sequence segment being a sequence of words that includes a keyword of the keyword store;
    a component that identifies, from the identified sequence segments, patterns of sequences of words that include a keyword by comparing a sequence segment to other sequence segments to determine whether a pattern can be derived from the sequence segments by applying a pattern mining algorithm to the identified sequence segments to identify patterns of words adjacent to the occurrences of the keywords based on comparison of words adjacent to an occurrence of a keyword to words adjacent to other occurrences of keywords to derive patterns from the adjacent words, some of identified patterns including a keyword;
    a component that filters out from the identified patterns the identified patterns that do not include a keyword;
    a component that filters out from the identified patterns the identified patterns that include only preposition in addition to a keyword;
    a component that identifies, from the sentences of the corpus, keywords within the identified patterns that satisfy a keyword confidence criterion and adds the identified keywords to the keyword store; and
    a component that determines whether a termination criterion is satisfied so that the iterative identification of sequence segments, patterns, and keywords is terminated.

10. The computing device of claim 9 including a component that substitutes a keyword symbol for the keywords of the sequence segments.

11. The computing device of claim 9 wherein the component that identifies keywords determines whether a keyword satisfies a keyword confidence criterion that is based on pattern confidence scores of patterns that match sequence segments that contain the keyword.

12. The computing device of claim 9 wherein the component that identifies patterns identifies a pattern when support for the pattern satisfies a pattern support criterion.

13. The computing device of claim 12 wherein the support for a pattern is represented by a pattern support score and the pattern support criterion is a minimum pattern support score needed for the pattern to be considered a candidate pattern.

14. The computing device of claim 9 wherein the component that identifies the patterns applies a sequential pattern mining technique.

15. A computer-readable medium containing instructions for controlling a computing device to identify topic information from a corpus of sentences of words, by a method comprising:

storing an initial set of keywords; and repeating the steps of identifying sequence segments of the sentences of the corpus, a sequence segment being a sequence of words that includes a keyword of the stored keywords;

identifying from the identified sequence segments patterns of sequences of words that include a keyword and that satisfy a pattern support criterion by comparing a sequence segment to other sequence segments to determine whether a pattern can be derived from the sequence segments by applying a pattern mining algorithm to the identified sequence segments to identify patterns of words adjacent to the occurrences of the keywords based on comparison of words adjacent to an occurrence of a keyword to words adjacent to other occurrences of keywords to derive patterns from the adjacent words, some of identified patterns including a keyword;

filtering out from the identified patterns the identified patterns that do not include a keyword;

filtering out from the identified patterns the identified patterns that include only prepositions in addition to a keyword;

identifying from the sentences of the corpus keywords within the identified patterns that satisfy a keyword confidence criterion; and storing the identified keywords until a termination criterion is satisfied.

16. The computer-readable medium of claim 15 wherein a termination criterion is satisfied when no new patterns are identified.

17. The computer-readable medium of claim 15 wherein an identified pattern further satisfies a pattern confidence criterion.

* * * * *